Aug. 9, 1949.
T. F. SCHWARTZ ET AL
2,478,842
SUBMARINE RADIATION APPARATUS
AND PHOTOGRAPHIC METHOD
Filed Jan. 19, 1945
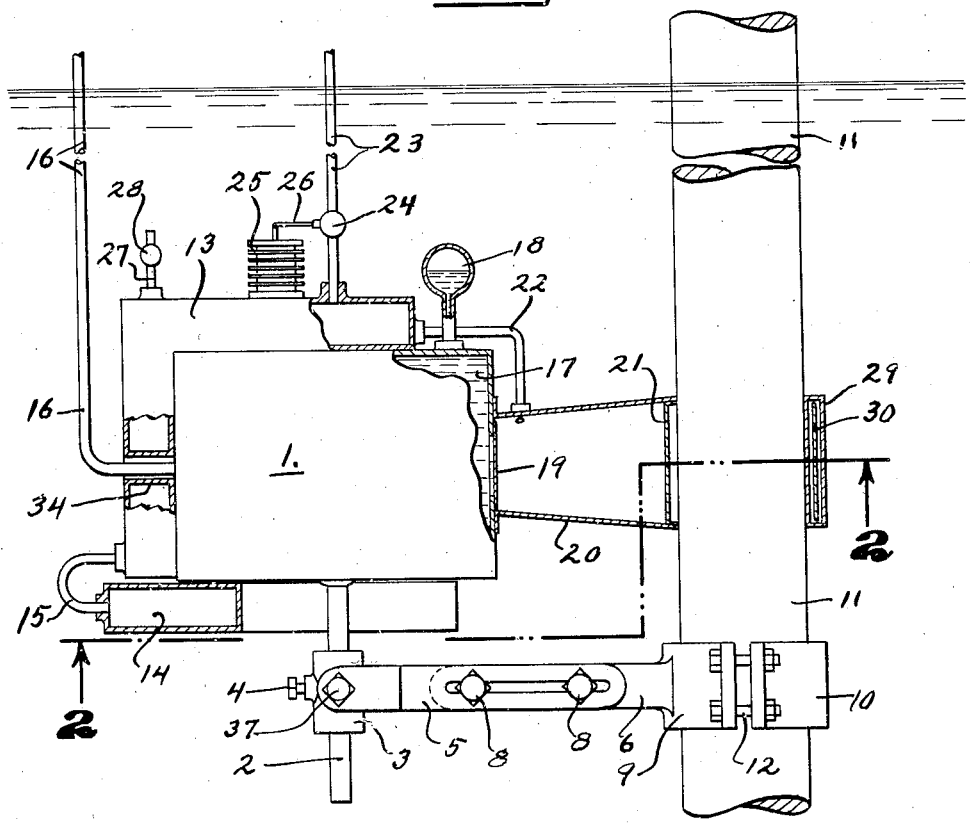
INVENTORS,
THEODORE F. SCHWARTZ.
ALFRED LEO GIORGI.
BY
Russell R. Harper.
AGENT.

Patented Aug. 9, 1949

2,478,842

UNITED STATES PATENT OFFICE 2,478,842

SUBMARINE RADIATION APPARATUS AND PHOTOGRAPHIC METHOD

Theodore F. Schwartz, San Bruno, and Alfred Leo Giorgi, South San Francisco, Calif.

Application January 19, 1945, Serial No. 573,566

6 Claims. (Cl. 250—53)

The present invention relates to radiation equipment, and more particularly to radiation equipment suitable for underwater use in the photographic inspection of submarine objects and to a method of utilizing such equipment.

There are many instances wherein it is necessary or desirable to inspect the internal structure of objects which are normally beneath the surface of water, as, for example, dock and warehouse piling, underwater foundations of all types, the hulls, screws and other parts of vessels, submarine pipe lines and cables, etc.

In the past the only suitable methods for inspecting such objects required either partial destruction of the object or raising of the same above the water level and then employing X-ray or other radiation inspection techniques. For example, certain Mollusca, such as those of the family Teredinidae, particularly the species *Teredo navilis* (commonly called teredos or ship-worms) are notorious for the destruction which they cause in the timbers of wooden ships, the woodwork of harbors, and piles or other woodwork immersed in sea water for periods of time. The teredos inhabit long cylindrical holes, which they excavate in the wood, and usually occur in great numbers, crowded together so that only a very thin film of wood remains between adjacent burrows. The point of entry of the teredo is usually so small as to be invisible for practical purposes. If the attack by the teredos remains undiscovered, the structure is soon weakened to the point of collapse.

Since the teredos are known to be prevalent in all the seas of the world, it is necessary continuously to inspect all wood structures which are immersed in sea water. The common method of inspection involves the cutting out of a section of the structure by a diver and bringing the same to the surface for examination. Since there is no satisfactory means for determining by external examination whether the wood is infested by teredos and, if so, where the attack is beginning, it has often been found that structures inspected by sectioning inspection and apparently sound, actually were infested in areas adjacent to those inspected. On the other hand, sections have at times been inspected and found to be infested and on the basis of such inspection the entire structure replaced, only to find that the replacement was unnecessary and that only a small part of the structure was infested. This type of inspection is considered to be unsatisfactory not only because of the unreliability of the results obtained, but because of the great expense involved in the sectioning and the fact that the portions tested are destroyed by the test and must be replaced.

Similar problems arise in the testing of other submarine structures for evidence of damage or weakness, as, for example, when the condition of the plate seams or propeller shaft of a ship is suspected, it is necessary to drydock the ship in order to examine satisfactorily the shaft. Similarly, when the insulation of submarine cables or the condition of submarine pipelines requires inspection, it is usually necessary to raise the doubtful sections to the surface of the water in order to examine the same, a tedious, often dangerous and in all cases exceedingly expensive procedure.

Various attempts to overcome these difficulties, particularly in the instance of teredo infestation, have been made in the past. Various materials have been employed in order to overcome the teredo attack, as, for example, concrete or wood impregnated with various chemicals, such as creosote, sodium silicate, etc., and divers types of wood have been utilized as a substitute for those woods known to be readily susceptible to teredo attack. In all such cases it has been found that the protection is doubtful and that eventually some species of teredo or other marine pest appears which will attack the material utilized or which is not affected by the protective coating employed. Those materials which are not subject to attack by such pests, such as steel, for example, are either too expensive for this type of construction or unsatisfactory because of their susceptibility to corrosive attack by the sea water.

It is an object of the present invention to provide means and methods for the testing and examination of submarine structures and the like without damage to the same. A further object is to provide means and methods for such inspections which are relatively inexpensive and may be rapidly and expeditiously carried out regardless of the nature of the submarine object to be inspected. More specifically, it is an object of this invention to provide radiation equipment and methods for using the same which are suitable for submarine inspection work. Still another object is to provide a submarine radiation apparatus which may be readily handled and utilized by a single diver and which may be readily adjusted to any desired position for use. A still further object is to provide ballasted radiation equipment for submarine use and means for automatically adjusting the internal pressure of certain elements thereof to compensate for pressures encountered at various water depths.

Other objects, together with some of the advantages to be derived in utilizing the present invention, will become apparent from the following detailed description of an embodiment of the invention, taken together with the accompanying drawings forming a part of the specification and wherein:

Fig. 1 is an elevation, partly in section, of an embodiment of submarine radiation apparatus constructed according to the invention.

Fig. 2 is a view taken through 2—2 of Fig. 1.

Referring to the drawings, the apparatus comprises an X-ray generator 1, which may suitably be in the form of the conventional industrial X-ray camera. Support rod 2 is attached to the bottom of generator 1 and passes through a sleeve 3 provided with a threadedly engaged set-screw 4. Sleeve 3 is pivotally attached to and supported by support arm 5, which, in turn, is attached to and supported by support arm 6; support arms 5 and 6 being provided with longitudinal slots through which adjustment bolts 8 pass. Set-screw 37 serves to secure sleeve 3 in the desired position with respect to support arm 5. Support arm 6 is formed as a part of support bracket 9 which, in turn, is attached to support bracket 10; support brackets 9 and 10 being secured to each other and an object to be inspected, such as piling 11, by means of bolts, as at 12.

Ballast tank 13 is rigidly attached to generator 1 and extends along the top and back thereof, being provided with a sleeved opening at 34, through which a flexible cable 16 passes into the interior of generator 1 and supplies electrical energy thereto. A second ballast tank 14 is provided with flanges 31 and 32 which are, in turn, provided with longitudinal slots, through which bolts 33 pass and secure the tank to the bottom of generator 1. A longitudinal slot is also provided in tank 14, support rod 2 passing therethrough. Flexible conduit 15 leads in flow communication from the interior of ballast tank 13 to the interior of ballast tank 14.

Generator 1 is conventionally formed of metal and provided with a lining of material, such as lead, which is impervious to X-ray radiation. The emission port in the front of generator 1 is covered with a plate 19 (when a cooling liquid is utilized in the generator) formed of a material which will pass X-ray radiation, such as relatively thin sheets of aluminum, copper, brass and alloys thereof, plastic compositions, etc., and forms a liquid-tight seal over the emission port. The generator 1 usually, although not necessarily in all instances, is filled with a cooling liquid 17, such as oil expansion bulb 18, which is partially filled with air or other gaseous material, being in flow communication with the interior of generator 1 in order to provide space for the expansion of cooling liquid 17 as the same is heated by the operation of the Coolidge tube or other similar source of X-ray emanation (not shown) contained within generator 1.

Tube 20 flares outwardly, as shown, and is attached to the front of generator 1, forming a liquid-tight seal therewith and is closed at its forward end by means of a plate or disk 21 formed of a material which is pervious to X-ray radiation, similar to plate 19. Tube 20 is preferably formed of a material which is relatively impervious to X-ray radiation, such as lead-lined steel or other metal, plastic material, or any other suitable material. Conduit 22 leads in flow communication from the interior of tube 20, which forms the walls of an air cell, to the interior of ballast tank 13.

The provision of an air cell between the source of radiation and the object to be photographed is an essential part of the invention in that we have found that this element or an equivalent arrangement is necessary if clear and sharp images are to be obtained upon the photographic plate. It appears to be necessary to provide a dispersion path between the source of radiation and the object to be photographed in order that scattered radiations be absorbed and that the radiations passing through the object to be inspected approach a parallel path. If the source of radiation is too close to the object which is being photographed, the various angles at which the scattered radiations pass through the object result in interference patterns which impair the clarity and resolution of the image obtained on the photographic plate. When the source of radiation is moved further away from the object, preferably to a distance of the order of 12 inches to 54 inches, these scattered radiations are absorbed by the body of the generator and the air cell and the radiations which pass through the object to be inspected are traveling in paths approaching the parallel. It is a fundamental concept of the present invention, accordingly, that a dispersion path be provided between the source of radiation and the object to be inspected and that the material filling the dispersion path have an opacity to X-ray and like radiations less than that of sea water. The term "air cell" is, therefore, intended to include any structure which defines a suitable dispersion path. The "air cell," which may also be considered to be a dispersion cell, may be filled with any material having an opacity to the radiations employed less than that of sea water. For the great majority of cases, it is apparent that a gaseous material is the most suitable.

Flexible conduit 23 leads from a source of fluid, under pressure, to the interior of ballast tank 13 and is provided with a valve at 24. Air is a convenient fluid for the intended purpose, although other suitable gases, such as hydrogen, nitrogen, carbon dioxide, oxygen, carbon monoxide, etc., or fluids, such as fresh water, liquid hydrocarbons, oil, etc., may also be utilized. The essential factor is that the fluid have an opacity less than that of sea water to X-rays and similar radiations. Sylphon bellows 25, or other pressure responsive means, is positioned on the top of ballast tank 13 and in flow communication with the interior thereof. Valve actuating link 26 is connected to valve 24 and Sylphon bellows 25. A short discharge conduit 27 is in flow communication with the interior of ballast tank 13 and is provided with a pressure relief valve 28.

The operation of the apparatus is as follows:

Generator 1 is normally of sufficiently heavy construction to withstand, without damage, the pressures encountered at the water depths at which the apparatus is normally utilized. Due to the relatively great weight of such generators, however, (the conventional industrial equipment usually weighing on the order of five hundred pounds or more) it is not practicable for one man to handle the same, particularly under the normal handicaps existing beneath the surface of the water. Ballast tanks 13 and 15 are accordingly of such size as to render the generator but slightly negative in buoyancy when in water, i. e. having an apparent weight of the order of twentyfive to fifty pounds and thus easily maneuvered by a single diver. However, if sufficiently heavy construction is employed in constructing the ballast tanks to withstand the water pressure, the ballast tanks must generally be increased disproportionately in size in order to ballast both their own weight and that of the X-ray generator. It is, therefore, preferred to form the ballast tanks of relatively light weight metal and compensate for the water pressure by adjustment of the internal pressure in the ballast tanks.

One means for accomplishing this is illustrated in assembly of Fig. 1. As the X-ray unit is lowered in the water, usually by means of a windlass mounted on a barge, or the like, the external pressure on the ballast tanks increases with the depth of the water. The external pressure also acts on Sylphon bellows 25, however, tending to compress the same. This action causes link element 26 to move in a direction to open valve 24 and admit compressed air to the interior of ballast tank 13. When the air pressure in ballast tank 13 is sufficient to counter-balance the external water pressure, the internal pressure in Sylphon bellows 15 urges the bellows in the reverse direction, resulting in movement of link element 26 in a direction to close valve 24. Thus, regardless of the depth to which the generator unit is lowered, the internal pressure of ballast tank 13 is always maintained at a point sufficient to compensate for the external water pressure thereon and prevent serious deformation of the ballast tank. Since ballast tank 14 is in flow communication with the interior of ballast tank 13, through conduit 15, the pressure within ballast tank 14 is also maintained at a point sufficient to compensate for the external water pressure thereon.

Similarly, the pressure in tube 20 is maintained, through conduit 22, at a point sufficiently high to prevent deformation of the tube or plate 21 by external water pressure. Since plate 19 is relatively small in size and is subjected on one side to the hydrostatic pressure of the cooling liquid 17, it is not seriously affected by the pressure built up in tube 20.

When the generator unit is raised towards the surface of the water, it is apparent that the internal pressure in the ballast tanks 13 and 14 and in tube 20 would tend to burst these elements as the external pressure decreased as the surfacing operation was carried out. Pressure relief valve 28 is accordingly provided to vent the compressed air from the ballast tanks 13 and 14 and tube 20, this valve being set to remain closed when the external water pressure is greater than or equal to the pressure within the ballasting system and to open when the internal pressure is slightly greater, say, of the order of one p. s. i., than the external water pressure. Thus, as the generator unit is raised, compressed air is vented through conduit 27 to maintain but a slight positive pressure in the ballasting system.

When examining piling, for example, the diver first descends and attaches support brackets 9 and 10 to the piling, as shown in Fig. 1, support arms 5 and 6 being extended to the approximate length necessary to support the X-ray unit at the desired distance from the piling. The X-ray unit is then lowered to him from above and support rod 2 passed through sleeve 3 and secured in position by means of set-screw 4. Support arms 5 and 6 may then be accurately adjusted by means of bolts 8 in order to position precisely the X-ray unit at the proper and desired distance from the piling. Since the X-ray unit has but a slight negative buoyancy, these adjustments are readily accomplished by a single man.

The diver then positions a water-tight film holder 29, containing a sensitized film 30, behind the piling in such a manner that the X-ray emanations passing through the piling will strike the same. The film holder may be formed of any suitable waterproof material which is previous to X-rays and may be clamped to the piling in any suitable manner if so desired. The diver thereupon signals to the operators above the surface of the water and current is supplied to the generator through cable 16 for a sufficient period of time to obtain the necessary exposure.

In the event that the object which is to be examined is not normally in a vertical position, the X-ray unit may be tilted to the desired angle by loosening set-screw 37 and tilting sleeve 3. In order to facilitate this operation, ballast tank 14 may be adjusted by loosening bolts 33, the ballast tank being moved towards the rear of the X-ray unit if it is desired to tilt the front end thereof downwards and moved towards the front end if it is desired to tilt the X-ray unit upwards.

In taking radiation photographs of objects with opposite sides thereof which are not parallel, as in the case of a round object, such as a piling, it is usually considered desirable to utilize a masking medium. For example, referring to Fig. 2, it is apparent that if sufficient exposure is provided to obtain the desired image through the center of the piling there would normally be an overexposure of the sections towards the sides thereof, these dimensions being taken with respect to a line along the longitudinal axis of tube 20, through the center of the piling and the center of film holder 29. Accordingly, it is common practice in photographing such objects to fill the areas, generally indicated at 35 and 36, with a material which has approximately the density or opacity to the radiations as the object being examined. We have found that sea water has a suitable opacity for use as masking medium when photographing wood and materials of similar opacity. Thus, in submarine photography the areas designated at 35 and 36 are, of course, occupied by sea water, and we have found that sharply defined and uniform negatives are obtained when photographing objects of the aforementioned categories which would normally require a masking medium. In those instances wherein sea water is not a suitable masking medium, the areas designated at 35 and 36 should be loosely packed with lead wool or any other suitable masking medium.

In many instances it has been found desirable to utilize filters in the examination of objects by radiation technique. These filters are usually metal plates formed of aluminum, copper or similar materials, their action being to filter out those radiations which are not of the wavelengths best suited for the radiation photography of a given material. Since most of the conventionally employed radiation sources generate emanations over a fairly wide range of wavelengths, it is customary to employ one or more filters between the radiation source and the object being examined in order to exclude the undesirable wavelengths.

In the present apparatus, the plates at 19 and 21, which define the ends of the air cell formed by tube 20, the air cell being necessary to provide the desired dispersion path before passing the radiations through the object to be photographed, may conveniently be formed of such materials as to provide the desired filtering effect. Alternatively, of course, materials which do not have the desired filtering effect may be employed at 19 and 21 and filter plates attached thereto.

Although a particular and preferred embodiment of the invention has been detailed in the above description, it will be appreciated that various modifications may be incorporated therein without departing from the scope and principles of the invention. For example, any suitable source of X-ray or gamma ray emanation may be employed in the generator which will provide emanations in the approximate range of 0.01–150 Angstrom units, as, for example, Coolidge or Roentgen tubes, radium, radio-active materials, such as radium salts, artificial radio-active materials, and the like. Although the ballast tanks have been shown as mounted only on the top, back and bottom of the generator unit, additional or substitute ballast tanks may be mounted on the sides thereof, if necessary or desirable, and these tanks may be mounted for adjustment in the manner described in relation to the bottom ballast tank of the embodiment of the drawings.

If the unit is only to be utilized at relatively shallow water depths, the pressure counterbalancing system may be eliminated or only utilized in connection with the air cell tube or a manually controlled system may be substituted for the automatic system shown. It is apparent, of course, that the generation unit may be supported on the sea floor by means of a tripod, or the like, rather than mounted on the object to be examined, as shown in the drawings, or may be lowered on guides extending to the surface and positioned without the aid of a diver.

Although air cell tube 21 has been illustrated as a separate unit mounted externally to the generator, it will be appreciated that the air cell tube may be disposed either partially or entirely within the generator unit. In those instances wherein a liquid coolant, such as oil, is not employed within the generator, as, for example, when relatively low-power X-ray tubes or when radium or radium salts, and the like, are utilized as the radiation source, the body of the generator may serve as an air cell and the need of a separate air cell obviated. In such instances it is necessary to position the radiation source towards the rear of the generator in order that the required dispersion path between the radiation source and the object to be photographed be provided. When employing this type of unit the generator may be provided with pressure compensating arrangement, such as shown in the drawings in connection with the ballast tanks and air cell, or, alternatively, the generator may be of sufficiently heavy construction to withstand the water pressures encountered or may be filled with a non-compressible liquid which has an opacity less than that of sea water to the radiation generated.

Particular advantages ascribed to the present equipment are the facts that there is no danger to the operator by exposure to X-ray or similar radiations, generator 1 and air cell tube 21 being formed of materials which have relatively great opacity to the X-rays; the unit is self-compensating for the various pressures encountered at various water depths; it may be readily handled beneath the surface of the water by a single operator and is easily adjusted to any desired position for photographing any submarine object. The apparatus of the present invention is particularly adapted for use in examining submarine structures for evidence of attack by teredos and similar boring pests. We have found, contrary to expectations, that clear and sharply defined images of the holes made by teredos and the like are obtained, even in those instances wherein the teredos no longer inhabit the holes, when X-rays or similar radiations are passed through a structure which has been attacked and a photographic plate exposed thereto in the manner described. Although the precise reason for this phenomenon is not known, it is probable that the holes are lined with some calcareous substance secreted by the mollusc which has an opacity to X-rays and the like different from that of the structures.

We claim:

1. In submarine radiation apparatus, the combination comprising a source of radiation, a housing formed of material opaque to said radiations enclosing said radiation source, an emission port in said housing, a dispersion cell attached to said housing and positioned over said emission port, closure means formed of material pervious to said radiations closing the outer end of said dispersion cell, a ballast tank mounted on said housing, flow communication means between said ballast tank and said dispersion cell, and means for supplying fluid under pressure to said ballast tank in accordance with pressure increases on the external surfaces of said ballast tank and dispersion cell.

2. In submarine X-ray apparatus, the combination comprising a source of X-ray emanation, a housing formed of material opaque to X-ray emanations enclosing said emanation source, an emission port in said housing, a dispersion cell attached to said housing and positioned over said emission port, closure means formed of material pervious to X-ray emanations closing the outer end of said dispersion cell, a first ballast tank mounted on said housing, a second ballast tank adjustably mounted on said housing, flexible conduit means leading in flow communication from said first ballast tank to said second ballast tank, conduit means leading in flow communication from one of said ballast tanks to said dispersion cell, and means for supplying a gas under pressure to said first named ballast tank.

3. In submarine X-ray apparatus, the combination comprising a source of X-ray emanation, a housing formed of material opaque to X-ray emanations enclosing said emanation source, an emission port in said housing, a dispersion cell attached to said housing and positioned over said emission port, closure means formed of material pervious to X-ray emanations closing the outer end of said dispersion cell, a ballast tank mounted on said housing, means for equalizing the pressure in said ballast tank and said dispersion cell to form a balanced pressure system, means for supplying a gas under pressure to said pressure system, a valve controlling the supply of compressed gas to said pressure system, and pressure responsive means coacting with said valve, whereby the pressure in said pressure system is increased in accordance with pressure increases bearing externally on said pressure system.

4. In submarine X-ray apparatus, the combination comprising a source of X-ray emanation, a housing formed of material opaque to X-ray emanations enclosing said emanation source, an emission port in said housing, a dispersion cell attached to said housing and positioned over said emission port, closure means formed of material pervious to X-ray emanations closing the outer end of said dispersion cell, a ballast tank mounted on said housing, means for equalizing the pressure in said ballast tank and said dispersion cell to form a balanced pressure system, conduit means for supplying a gas under pressure to said pressure system, a valve in said conduit means, a pressure responsive element subject to the pressure existing in said pressure system and to external pressure, valve actuating means linking said valve and said pressure responsive element, whereby said valve is opened when the external pressure exceeds the pressure in said pressure system and closed when the pressure in said pressure system is at least equal to the external pressure, and pressure relief means in flow communication with said pressure system, whereby pressure in said pressure system is released when the external pressure is less than that existing in said pressure system.

5. In submarine X-ray apparatus, the combination comprising a source of X-ray emanation, a housing formed of material substantially opaque to X-ray emanations enclosing said emanation source, an emission port in said housing, a first plate formed of material pervious to X-ray emanations forming a liquid-tight seal with said housing and covering said port, a cooling liquid filling said housing, an expansion chamber in flow communication with the interior of said housing, a dispersion cell attached to said housing and positioned over said emission port, a second plate formed of material pervious to X-ray emanations closing the outer end of said dispersion cell, a ballast tank mounted on said housing, means for supplying a gas under pressure to said dispersion cell, and pressure responsive means controlling the supply of compressed air to said dispersion cell, whereby the pressure in said dispersion cell is increased in response to pressure increases on the external surfaces of said dispersion cell and said second plate.

6. In submarine X-ray apparatus, the combination comprising a source of X-ray emanation, a housing formed of material substantially opaque to X-ray emanations enclosing said emanation source, an emission port in said housing, a first plate formed of material pervious to X-ray emanations forming a liquid-tight seal with said housing and covering said port, a cooling liquid filling said housing, an expansion chamber in flow communication with the interior of said housing, a dispersion cell attached to said housing and positioned over said emission port, a second plate formed of material pervious to X-ray emanations closing the outer end of said dispersion cell, a ballast tank mounted on said housing, flow communication means between said dispersion cell and said ballast tank, a conduit leading from a source of gas under pressure to said ballast tank, a valve in said conduit, a pressure responsive element mounted on said ballast tank in flow communication therewith and subject to external pressure, actuating means between said pressure responsive element and said valve, whereby the pressure in said ballast tank is increased in proportion to increases in external pressure on said pressure responsive element and pressure relief means in flow communication with said ballast tank, whereby pressure is released from said ballast tank when the external pressure is less than that existing in said ballast tank.

THEODORE F. SCHWARTZ.
ALFRED LEO GIORGI.

REFERENCES CITED

The following references are of record in the file of this patent:

UNITED STATES PATENTS

| Number | Name | Date |
|---|---|---|
| 631,222 | Mason | Aug. 15, 1899 |
| 1,131,712 | Klein | Mar. 16, 1915 |
| 2,005,035 | Houtman | June 18, 1935 |
| 2,091,978 | Gross | Sept. 7, 1937 |
| 2,091,978 | Graves | Sept. 7, 1937 |
| 2,110,764 | Graves | Mar. 8, 1938 |
| 2,387,597 | McLachlan | Oct. 23, 1945 |